April 14, 1953 W. P. TAYLOR, JR 2,634,923
WINDING PACKAGE
Filed Aug. 28, 1946 5 Sheets-Sheet 1

INVENTOR
WALTER P. TAYLOR, JR.
BY
Bailey, Stephens & Huettig
ATTORNEYS

April 14, 1953     W. P. TAYLOR, JR     2,634,923
WINDING PACKAGE

Filed Aug. 28, 1946     5 Sheets-Sheet 2

INVENTOR
WALTER P. TAYLOR, JR.

BY Bailey, Stephens & Haettig
ATTORNEYS

April 14, 1953 W. P. TAYLOR, JR 2,634,923
WINDING PACKAGE
Filed Aug. 28, 1946 5 Sheets-Sheet 4

INVENTOR
WALTER P. TAYLOR, JR.
BY
Bailey, Stephens+Huettig
ATTORNEYS

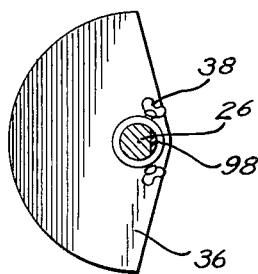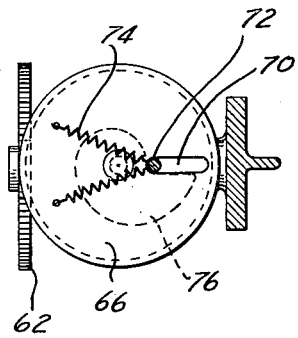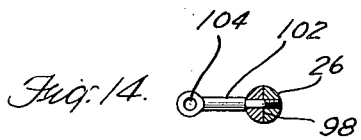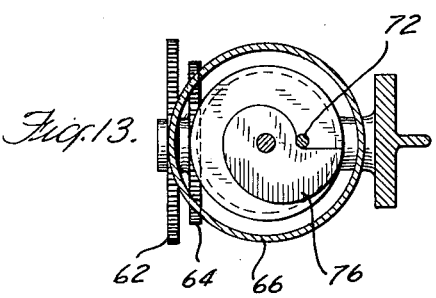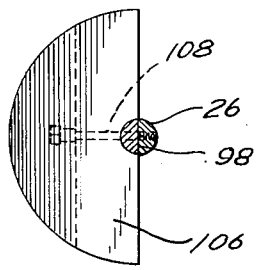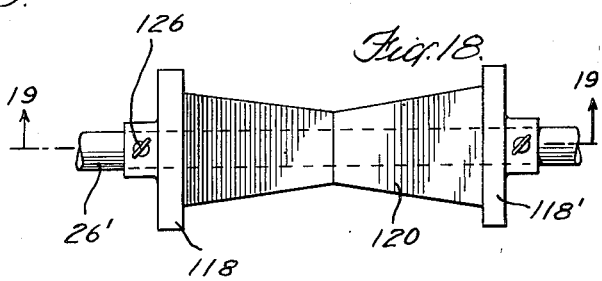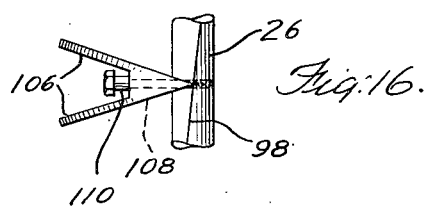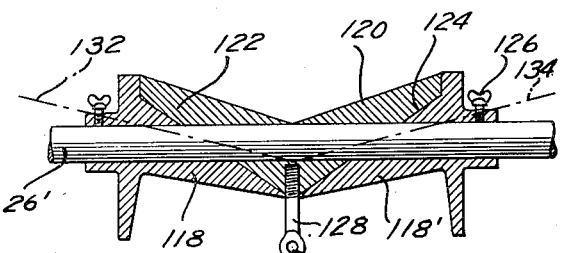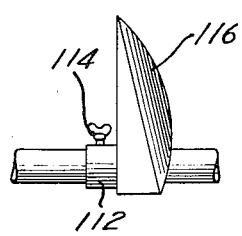

Patented Apr. 14, 1953

2,634,923

UNITED STATES PATENT OFFICE 2,634,923

WINDING PACKAGE

Walter P. Taylor, Jr., New York, N. Y.

Application August 28, 1946, Serial No. 693,441

4 Claims. (Cl. 242—159)

1

The invention relates to winding, and more especially to the winding of resilient materials such as wire. It contemplates both a machine for producing wound coils of flexible material and the coils so produced.

In the past, efforts have been made to produce coils or balls of flexible materials from which the material could be withdrawn without kinking or snarling. All previous solutions to this problem have been complicated and generally unsatisfactory. The primary object of the present invention is to provide a new type of coil which is easy to make, and from which wire or the like can be withdrawn readily and without danger of kinking.

I am aware that some very flexible materials have heretofore been wound in a series of figure 8's, but in every case the supplies of material so formed have been laid flat, that is, with the opposing bights of each length in substantially the same plane. Such a winding is bulky, it is hard to handle because it is not self-supporting, and is slow and expensive to produce. The present invention, in contrast, contemplates a coil formed of a series of figure 8 lengths, which is compact and generally spherical, and which is largely self-supporting. For this purpose, the coil is made up of windings in the form of lengths each forming a figure 8, with the opposite loops or bights of each length lying in planes which form an angle of not less than about 90 degrees with each other.

A further object of the invention is to produce a coil of this type which can be wound easily and economically, and to provide a machine for the production of such a coil which is easy to construct and simple in operation.

It is difficult with present types of machinery to produce long lengths of a flexible material in a form in which they can be readily handled. Another object of the present invention is to provide a machine which will wind a series of connected coils of the type contemplated, so that pieces of great length can be produced from which the material can be drawn without kinking. The machine for obtaining this result is simple in construction and easy to operate.

Still another object of the invention is to produce a coil from which the wire or other material is withdrawn between the free ends of the two loops of a series of figures, and from the interior of the coil. This arrangement simplifies the production of the coil, and makes it easier to withdraw the wire from it.

An additional object of the invention is to produce a coil formed of a series of lengths each constituted by a figure 8, in which the crossing points of successive lengths progress around the axis of

2 the coil, so that the coil is substantially symmetrical around this axis. Such an arrangement is especially desirable in connection with large, heavy coils, since it makes them easier to roll over the ground when no conveyance is available for carrying them.

Further objects and advantages of the invention will appear more fully from the following description, especially when taken in conjunction with the accompanying drawings, which form a part thereof.

In the drawings:

Fig. 11 shows in side elevation one of the end plates of the machine.

Figure 9:
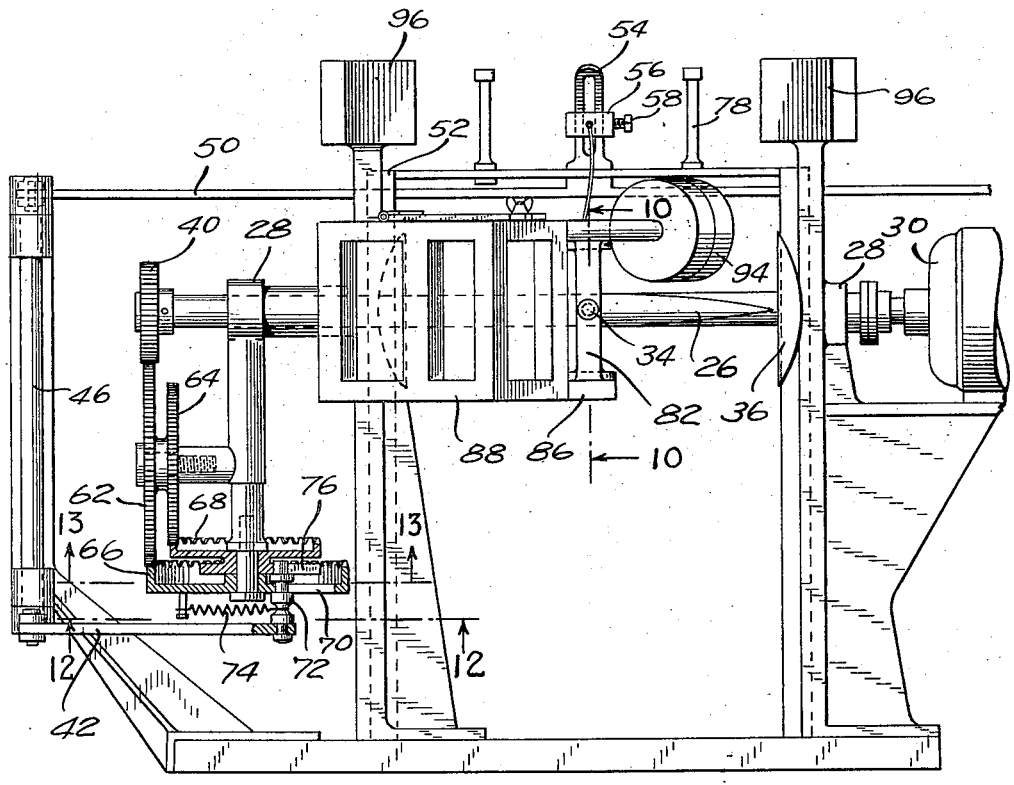
Fig. 9 is a rear view of this machine.

Figs. 12 and 13 are cross-sections on the lines 12—12 and 13—13 respectively of Fig. 9.

Fig. 14 shows in cross-section a form of divider for use when single coils are to be formed.

Fig. 15 shows another type of divider, in elevation.

Fig. 16 is a top plan view of the divider of Fig. 15.

Fig. 17 shows in top plan view a modified form of end plate.

Fig. 18 is a side elevation of a spindle for winding flat materials such as tapes.

Fig. 19 is a cross-section on the line 19—19 of Fig. 18.

Figure 8:
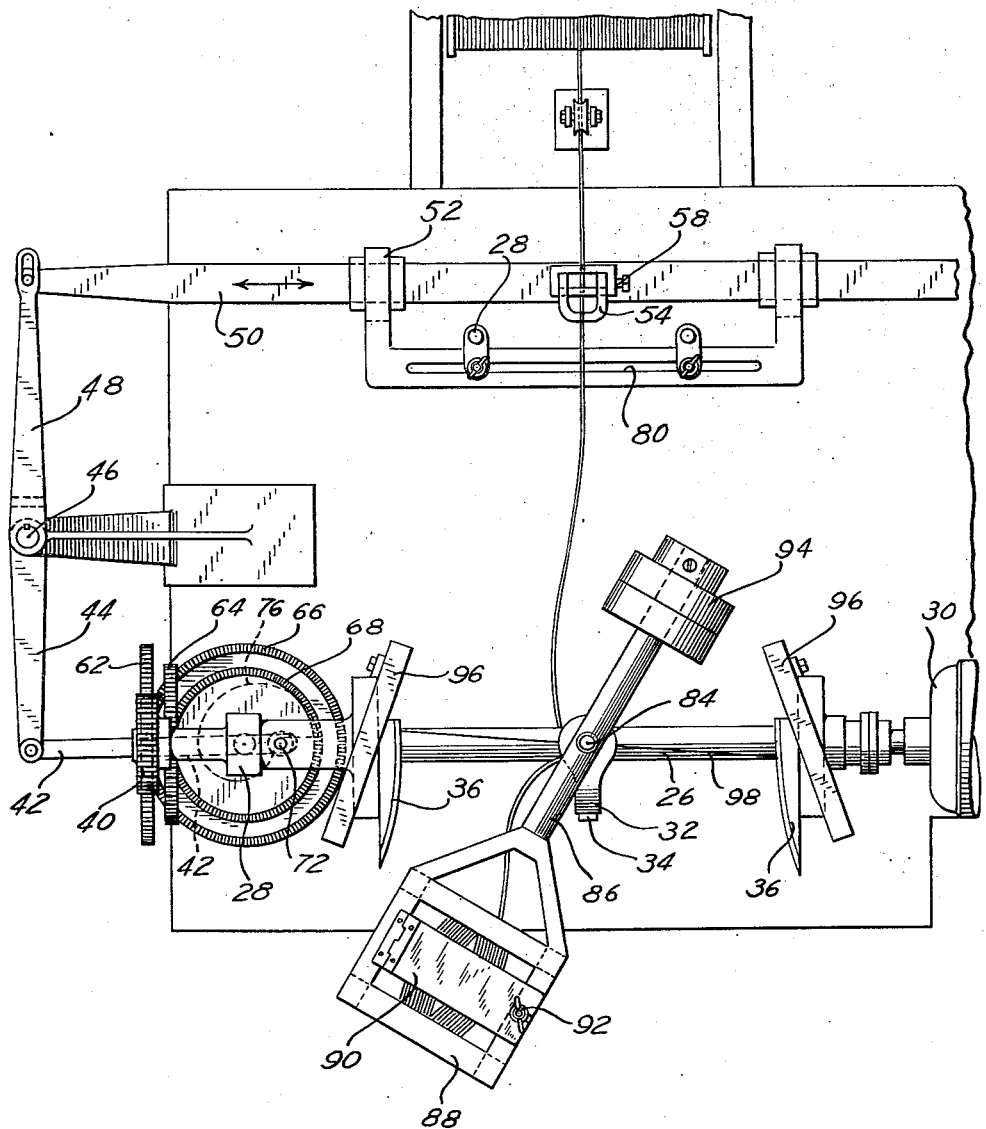
Fig. 8 shows in top plan view a machine for producing coils of the types shown in Figs. 1 to 7.

The coil shown in Figs. 1 to 4 is composed of a series of lengths each forming a figure 8. The cross-overs of these lengths substantially overlie each other. One length may for example consist of the two bights 2 and 4, crossing each other at 6. The coil is of course made up of a series of such lengths, wound one upon the next. It will be noted that the planes in which the opposite bights 2 and 4 lie are oblique to each other, these planes being indicated by lines 8—10 and 8—12 respectively, and that the angle between these planes is less than 90 degrees. In actual practice, the cross-overs do not stay exactly on top of each other, but instead slide off to the sides so as to form a somewhat irregular pattern at the rear of the coil. Nevertheless, the coil is substantially narrower in the rear than in the front.

The free end 14 of the coil is brought out between the free ends of the bights, a space being maintained in the coil at this point for this purpose. With such an arrangement, successive bights of the coil as it is wound receive opposite twists. When the material is withdrawn from the interior of the coil through the space between the bights, these successive reversed twists counteract each other and the material can be withdrawn without twisting or kinking.

When highly resilient material is wound in such a coil, it is ordinarily sufficiently self-supporting without any assistance. However, in order to prevent accidental separation of the coils, it may be desirable to place one or more strips of some adhesive tape partly around the coil, as indicated at 16 in Fig. 2.

Figure 1:
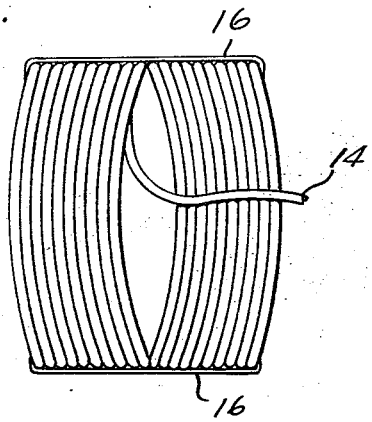
Fig. 1 is a front view of a form of coil embodying my invention.
Figure 2:
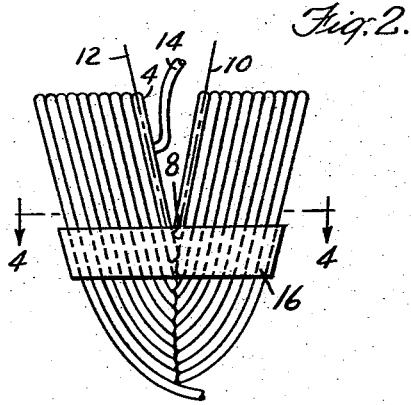
Figs. 2 and 3 are a top view and a rear view respectively of the coil shown in Fig. 1.
Figure 3:
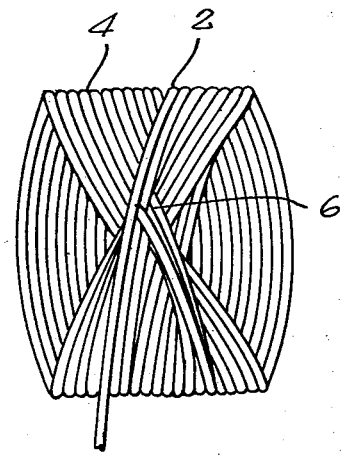
Figure 4:
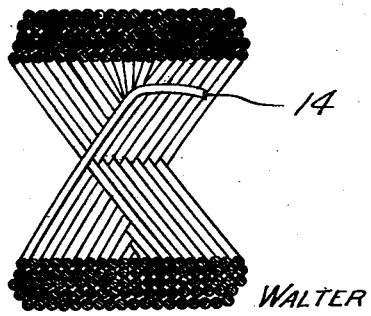
Fig. 4 is a cross-section on the line 4—4 of Fig. 2.
Figure 5:
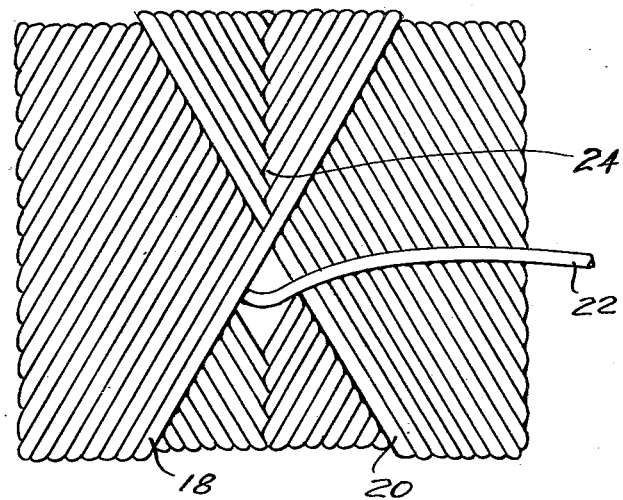
Figs. 5, 6 and 7 are a front view, a top view and a rear view, respectively, of a modified form of coil having its crossing points successively displaced around the coil axis.
Figure 6:
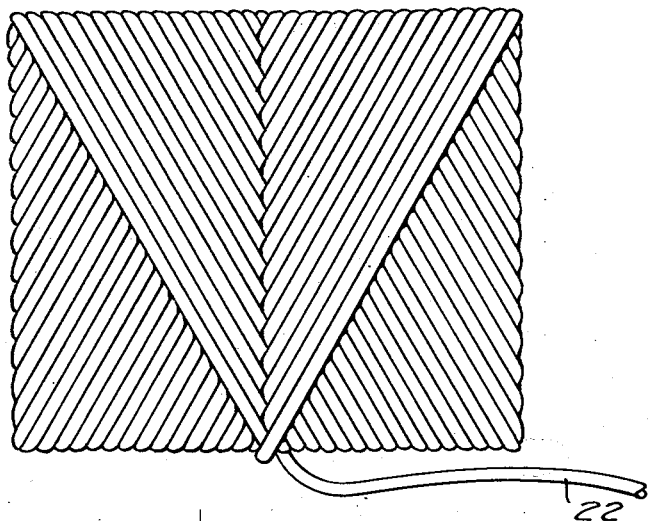
Figure 7:
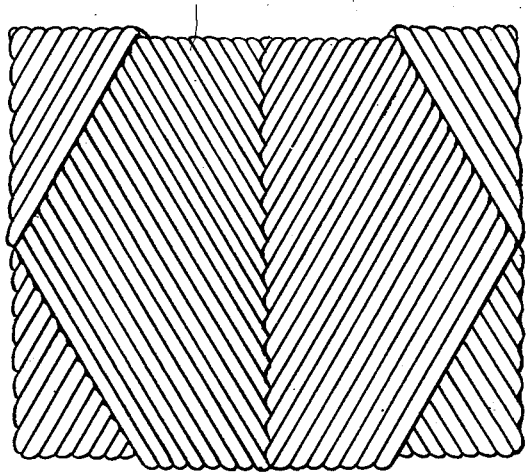

Coils of the type shown in Figs. 1 to 4 are satisfactory for most purposes, especially when they are not too large and heavy. However, they cannot be rolled along the ground very easily, because of their unsymmetrical shape. For large, heavy coils which may be taken where vehicles are unavailable, and which therefore must be capable of being rolled, the form of coil shown in Figs. 5 to 7 is preferred.

In this form, as in the one previously described, the coil is formed of a series of lengths each composed of a figure 8. One of these lengths is indicated by the two bights 18, 20, which are arranged in planes forming an angle of less than 90 degrees with each other. The free end 22 is brought out between the ends of the bights, through a space maintained for that purpose, for the withdrawal of material from the coil.

However, instead of having the cross-overs at the same point, this form of coil has successive cross-overs progressively shifted around the axis of the coil, so that the coil is substantially a cylinder symmetrical about the coil axis. Such a coil is easy to roll, and is in addition entirely self-supporting. The cross-overs are indicated for example at 24 in Fig. 5.

Both forms of coil have an opening through them, such opening extending through the opposed bights of the figure 8's. These openings are not used to receive holders, but must be unobstructed to permit proper withdrawal of the material.

Figs. 8 to 13 show a machine for winding the coils previously described. This machine comprises essentially a shaft or spindle mounted for rotation, and provided with an extending divider, with means for shifting the flexible material being wound on the spindle from one side to the other of the spindle at each revolution of the shaft.

Figure 10:
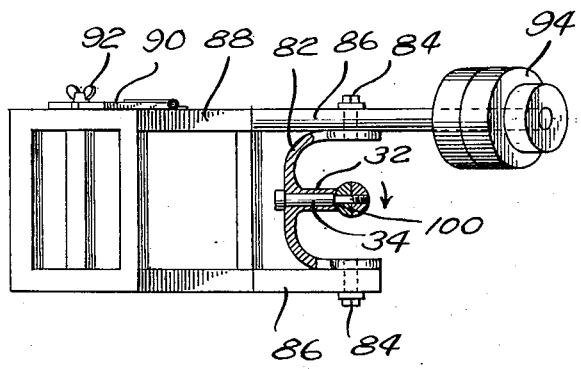
Fig. 10 is a cross-section on the line 10—10 of Fig. 9.

Figs. 8 and 9 show a spindle 26 mounted for rotation in bearings 28 of the machine frame, and driven in any suitable manner, as by a motor 30. The details of this spindle will be described below. Carried by the spindle and extending radially therefrom is a divider 32 which is removable from the spindle, for example being secured to it by a bolt 34 whose head rests against the end of the divider and which is threaded in the spindle. The type of divider shown in Fig. 10 is used when a number of coils are to be wound in series, in a way to be described, but simpler forms, of which examples are disclosed hereinafter, may be used. Spindle 26 is also provided with removable end plates 36 shown in Fig. 11, which are secured on the spindle by wing nuts 38. These end plates limit the spreading of the coil and aid in making it flat-sided and compact.

Mounted on one end of the spindle is a gear 40 which, through suitable gearing, causes reciprocation of a link 42 connected at its end to a lever 44 fixed on shaft 46. A second lever 48 on shaft 46 is connected by a pin and slot to a slide 50 arranged in guides 52 on the frame. This slide carries a guiding member composed of a slotted upright 54 on which is adjustably mounted an element 56 having a hole through it in alignment with the slot in the sliding guide, and capable of being fixed in an adjusted position on the guide by set screw 58.

The parts of the machine heretofore described represent the machine according to the invention in a very simple form, and their operation will be described before the remainder of the device is discussed. It will be shown later that the gearing shown has a special function, but is not essential to the broader aspects of the invention, and that the carrier arrangement shown in Fig. 10 is only required when a connected series of coils is to be wound. In the following discussion, the machine should be considered as if the divider or projection 32 of Fig. 10 were a simple radial pin.

Assuming that a supply of a flexible material such as wire is supplied from the reel 60, this wire is led through the hole in element 56 and is secured to the divider 32. The motor is then operated to rotate the spindle and winds the wire on it. At each revolution of the spindle, the slide 50 moves from one end of its path to the other, so that the wire which has been on the left hand side, for example, of the divider during one revolution of the spindle will be on the right hand side during the next revolution. The divider moves through the part of its travel on the side nearest the source of supply when the guide 54 is at one of the ends of its path. As a result, at each revolution, a bight is formed around the spindle lying on one side of the divider, and at the next revolution a similar bight is formed on the opposite side. The crossing points are on the side opposite the divider in the simplest form of the winding. Since such materials are generally somewhat slippery, the successive coils will tend to slip laterally on each other, until they are stopped by the end pieces 36, after which they will overlie each other to form a coil. This coil will be of the form shown in Figs. 1 to 4.

The gearing arrangement shown in Figs. 8, 9, 12 and 13 is provided so as to vary the travel of the guide 54 and thus to spread the successive coils along the spindle. Gear 40 drives a gear 62 which is rigid with a somewhat smaller gear 64 on the same shaft. These two gears engage concentric crown gears 66, 68 respectively. The web of gear 66 has in it a radial slot 70 in which slides a pin 72 the lower end of which is secured in link 42. Two springs 74 connected to this pin and to the gear web tend to hold the pin close to the axis of the gear. Rigid with gear 68 is a cam 76 which engages the top end of pin 72.

This arrangement operates in the following manner: When the parts are in the position shown in Fig. 13, at each revolution of the spindle the guide 54 moves through only a small distance since the pin 72 turns around its least radius. As the winding proceeds, the difference between the number of teeth on gears 62 and 64 causes gear 68 to turn slightly faster than gear 66 so that cam 76 gradually turns with respect to pin 72. This slowly forces the pin outwardly in its slot and thus increases its radius of rotation and the travel of guide 54. Finally, the outer end of the cam comes opposite the pin and it is released and pulled inward by springs 74 to its original position. In this way, the travel of the guide increases at each rotation until a layer of bights or coils has been laid across the spindle, and the guide is then restored to its original place and another layer is laid.

In some circumstances, it may be desirable to limit the travel of the wire to an amount less than the travel of the guide. For this purpose, adjustable posts 78 slidable along a slot 80 between the guide 54 and the spindle are provided. These posts will be engaged by the wire and will thus limit the spread of the coils on the spindle to the space between the posts even though the travel of the guide may be greater than this space.

One great advantage of the coils produced according to the invention is that a series of such coils may be wound connected together so that the material may be withdrawn from them successively in an unbroken line. For winding such coils, it is necessary that the coils already wound be carried around with the starting end of the coil being wound, of course without interfering with its winding. For this purpose, the carrier for such coils is mounted directly on the divider. As shown in Figs. 8 to 10, the divider 32 has arms 82 having at their ends pins 84 on which are pivoted carrier frame members 86. These frame members support a carrier composed of a suitable box of light construction for holding previously wound coils, indicated at 88. A closure 90 is hinged on the carrier and controlled by a latch 92. One of the frame members extends across the spindle to receive counterweights 94.

Fixedly mounted on the frame above the spindle 26 are two guiding plates 96 arranged in vertical planes inclined towards the source of supply.

This arrangement operates as follows:

Assume that the parts start in the position shown in Fig. 8, and that the spindle rotates in the direction indicated by the arrow in Fig. 10. During the first quarter rotation of the spindle, the carrier will move to a position directly above the spindle and the guide 54 will move towards the left of Fig. 8. If the carrier continued to turn in the position shown, it would in the next quarter turn engage the wire and thus interfere with the winding. At the end of this first quarter turn, however, the carrier engages the guiding plate 96 and is shifted to the right. The momentum of the carrier, when it meets this obstacle, is sufficient to carry it across to its furthermost position to the right. During the second quarter turn, the carrier moves through its position nearest the guide 54, but at the right hand side of the drawing, while the guide has moved to its position farthest to the left. During the next two quarter turns, the carrier moves to the angular position shown in Fig. 10 with respect to the spindle axis, but shifted to the right. During this period, guide 54 moves back to its central position. During the next quarter turn, guide 54 moves towards the right from its middle position. At the end of this period, carrier 88 engages the right hand guiding plate 96 and is shifted to the left. During the sixth quarter turn, carrier 88 moves around to the position nearest the guide 54, but shifted to the left, while the guide is in its most right hand position. During the next two quarter turns, the parts return to the original position shown in Fig. 8, and the same steps are repeated.

After one full coil has been wound, the bolt 34 is removed and the divider 32 is pulled out of the opening which it has formed in the coil, care being taken however to keep the free end of the wire from the interior of the coil extending out through the hole. The spindle is pulled out of the finished coil, and this coil is then placed inside the carrier, and winding is resumed without cutting the wire, until another coil has been wound and can likewise be placed in the carrier. This can be repeated as often as desired, depending on the unbroken length desired. Thus a series of connected coils is produced. When wire is withdrawn from the first coil until it is exhausted, the outer end of this coil goes into the opening of the next, and the coils can be drawn off one after the other until the wire is exhausted without kinking or tangling, without the use of reels or other holding equipment, and without rotation.

In order to make the removal of the spindle from the wound coil easier, it is preferably split along a diagonal line 98. The two parts have aligned holes as shown in Fig. 10, the bolt 34 having a shoulder 100 which engages the nearer half of the spindle, through which it passes freely, while it is threaded into the further half of the spindle. Thus the two parts are held tightly together during winding, but may be easily pulled apart endwise out of the finished coil as soon as the divider is removed.

The coil of Figs. 5 to 7 can be wound on the same machine. All that is necessary for this purpose is to change the ratio of the gears 62, 64, 66, 68 so that the guide 54 makes slightly more than, or slightly less than one complete reciprocation during each two turns of the spindle. This results in spacing the successive cross-overs angularly around the coil.

When only a single coil is to be wound, a divider of the type shown in Fig. 14 can be used. This is a simple pin 102 with a hole 104 in its free end for holding the starting end of the wire. The pin is secured to the spindle in the same manner as the bolt 34 described above.

Figs. 15 and 16 show still another form of divider. This is formed of two semicircular plates 106 arranged at a small angle to each other and with a block 108 fixed between them. A bolt 110 has an enlarged portion near its head which rests against this block, and its other end is threaded in the further half of the spindle 26. This will produce an opening of considerable angular extent in the finished coil through which the wire is withdrawn.

Fig. 17 shows an end plate which may be used for producing coils of special shape. This plate has a part 112 to be secured on the spindle by set screw 114, and a body portion 116. The body portion is in the shape of a portion of a sphere, with its convexity inwardly directed towards the coil. A coil wound when such an end piece is used will have its outer layers wider than its inner layers, and with certain types of material will be more substantial when so formed.

For winding flat flexible material, such as metal strip, rubber tape, ribbon or the like, I prefer to use a special spindle of the type shown in Figs. 18 and 19. This is composed of three parts secured removably on a main spindle 26' which is operated in the same manner as spindle 26. The three parts 118, 118' and 120 are separated along diagonal lines 122, 124 to permit easy removal from the finished coil. The outer parts 118, 118' are secured on the spindle by set screws 126, and hold part 120 between them. Divider 128 is removably mounted in the central part 120, and has an eye 130 to which the material to be wound can be secured.

The three parts are shaped to have a complete outside surface of special shape. This is composed of two parts each of generally circular cross-section, but with their axes inclined to each other and to the axis of the spindle. These axes are indicated at 132 and 134 in Fig. 19. Thus, when flat material is wound, it forms a coil in general similar to that of Figs. 1 to 4, that is, one in which each length is formed of a figure 8 with the planes of the successive bights forming angles of less than 90° with each other.

Preferably, to form a more substantial coil and to make for easier removal of the spindle from the finished coil, the two parts of the spindle are not of uniform diameter throughout, but have a diameter which increases from the center outward as shown in Fig. 18.

The invention thus produces a coil from which the material can be withdrawn without any rotation being necessary and still without twist or kinking resulting in the running line. This not only simplifies the paying out of the material but leaves both ends usable so that, if the material be hose or electric wire, it can be in use while being payed out or while still in the coil without the addition of extra connectors such as slip rings or packed joints.

In addition, a coil of the type described herein offers substantially no resistance to the withdrawal of the material, so that it can be paid out without requiring the use of any heavy pull on the free end. Also, since the coil does not rotate as the material is payed out, there is almost no momentum developed such as might cause backlash, and no braking means, like those required when drums are used, are needed.

Further advantages of the invention will be readily apparent from the foregoing description, and various modifications will readily occur to anyone skilled in the art. Therefore, while I have described herein some embodiments of my invention, I wish it to be clearly understood that I do not intend to limit myself thereby except within the scope of the claims hereto or hereinafter appended.

I claim:

1. A coil of flexible material comprising a series of superposed lengths of the material each forming a figure 8, the opposed bights of each length lying in planes forming an angle with each other, thereby forming a coil having an axial opening through the opposed bights, the crossing points of successive lengths being angularly spaced around the axis of the coil but being interrupted at one point to provide a radial opening into said axial opening, the free end of the innermost length extending outward through said radial opening, each coil proceeding continuously from the transverse plane containing such radial opening to a point most remote from said plane on one side of said plane, then in the other direction across such plane to a point on the other side of such plane most remote from such plane, and then back to such plane, whereby the radius of the axial opening in said plane is always at least as great as the radius of such axial opening at any point outside said plane.

2. A coil of flexible material comprising a series of superposed lengths of the material each forming a figure 8, the crossing points of successive lengths being angularly spaced around an axis so as to form a coil, but being interrupted at one point to provide a radial opening into said axial opening, the free end of the innermost length extending outward through said radial opening, each coil proceeding continuously from the transverse plane containing such radial opening to a point most remote from said plane on one side of said plane, then in the other direction across such plane to a point on the other side of such plane most remote from such plane, and then back to such plane, whereby the radius of the axial opening in said plane is always at least as great as the radius of such axial opening at any point outside said plane.

3. A coil of flexible material comprising a series of superposed lengths of the material each forming at least one figure 8, the opposed bights of each figure 8 lying in planes forming an angle with each other, thereby forming a coil having an axial opening through the opposed bights, the crossing points of successive lengths being angularly spaced around the axis of the coil but being interrupted at one point to provide a radial opening into said annular opening, the free end of the innermost length extending outward through said radial opening, each coil proceeding continuously from the transverse plane containing such radial opening to a point most remote from said plane on one side of said plane, then in the other direction across such plane to a point on the other side of such plane most remote from such plane, and then back to such plane, whereby the radius of the axial opening in said plane is always at least as great as the radius of such axial opening at any point outside said plane.

4. A coil as claimed in claim 3, in which said space is substantially larger than the cross-section of the flexible material.

WALTER P. TAYLOR, Jr.

References Cited in the file of this patent

UNITED STATES PATENTS

| Number | Name | Date |
|---|---|---|
| 302,461 | Worcester | July 22, 1884 |
| 579,054 | Garsed | Mar. 16, 1897 |
| 954,344 | Rhoades | Apr. 5, 1910 |
| 963,114 | Berry | July 5, 1910 |
| 1,592,432 | Barry | July 13, 1926 |
| 2,082,489 | Goldsmith | June 1, 1937 |
| 2,095,765 | Schenck | Oct. 12, 1937 |
| 2,231,092 | Schenck | Feb. 11, 1941 |

FOREIGN PATENTS

| Number | Country | Date |
|---|---|---|
| 85,289 | Germany | Feb. 24, 1896 |
| 90,552 | Germany | Feb. 16, 1897 |